United States Patent
Ichikawa et al.

(10) Patent No.: US 8,251,868 B2
(45) Date of Patent: Aug. 28, 2012

(54) TRAVEL OPERATION STRUCTURE FOR WORK VEHICLE

(75) Inventors: Nobushige Ichikawa, Izumi (JP);
Kentaro Nakamura, Wakayama (JP);
Susumu Umemoto, Nara (JP); Hisao Mukai, Sakai (JP); Shota Nagasawa, Sakai (JP); Takuya Inamori, Izumi (JP)

(73) Assignee: Kubota Corporation, Osaka (JP)

( * ) Notice: Subject to any disclaimer, the term of this patent is extended or adjusted under 35 U.S.C. 154(b) by 440 days.

(21) Appl. No.: 12/561,690

(22) Filed: Sep. 17, 2009

(65) Prior Publication Data

US 2010/0197453 A1    Aug. 5, 2010

(30) Foreign Application Priority Data

Feb. 3, 2009  (JP) .................................. 2009-22856
Mar. 30, 2009  (JP) .................................. 2009-82757

(51) Int. Cl.
*B60W 10/04* (2006.01)
*B60W 10/10* (2006.01)
*B60W 10/18* (2006.01)
(52) U.S. Cl. .......................................... 477/94; 477/95
(58) Field of Classification Search .................... 477/38, 477/40, 94, 95
See application file for complete search history.

(56) References Cited

U.S. PATENT DOCUMENTS

| | | | |
|---|---|---|---|
| 6,250,414 B1 * | 6/2001 | Sato et al. ..................... | 180/307 |
| 6,616,559 B1 | 9/2003 | Hori et al. | |
| 7,685,900 B2 * | 3/2010 | Fukasawa et al. ............... | 74/335 |
| 7,771,314 B2 * | 8/2010 | Eguchi et al. .................. | 477/110 |
| 2006/0260302 A1 | 11/2006 | Sakikawa | |
| 2009/0133951 A1 * | 5/2009 | Schultz et al. ................ | 180/307 |

FOREIGN PATENT DOCUMENTS

| | | |
|---|---|---|
| JP | 63-038030 A | 2/1988 |
| JP | 63107236 U | 7/1988 |
| JP | 2000127781 A | 5/2000 |
| JP | 2001180315 A | 7/2001 |
| JP | 2002316550 | 10/2002 |
| JP | 2006161979 A | 6/2006 |
| JP | 2006329213 A | 12/2006 |
| JP | 2008-137436 A | 6/2008 |
| JP | 2008-297766 A | 12/2008 |

* cited by examiner

*Primary Examiner* — Edwin A Young
(74) *Attorney, Agent, or Firm* — The Webb Law Firm

(57) ABSTRACT

A travel operation structure of a work vehicle, comprising a pair of left and right side brake pedals disposed on either the left or right of a steering wheel; a hydro static transmission for changing the speed of travel; and a stop operation pedal disposed on the other of the left and right of the steering wheel; wherein the corresponding left or right side brake is applied when one of the pair of left and right side brake pedals is depressed, and when both the left and right side brake pedals are depressed, both the left and right side brakes operate, and travel is stopped; and when the stop operation pedal is depressed, operating oil of the continuously variable speed change device is directed into an oil tank, and the continuously variable speed change device is switched to a neutral stop position for blocking transmission of power to the travel device.

8 Claims, 12 Drawing Sheets

TRAVEL OPERATION STRUCTURE FOR WORK VEHICLE

BACKGROUND OF THE INVENTION

The present invention relates to a travel operation structure for a work vehicle.

The technique described below is known as a travel operation structure for a work vehicle. Specifically, a pair of left and right side brake pedals is provided to the right of a steering wheel. When either the left or right side brake pedal is depressed, the side brake that corresponds to the left or right side is applied. When both of the side brake pedals are depressed at the same time, the left and right side brakes operate, and travel is stopped (see Japanese Laid-open Patent Publication No. 2008-297766, for example).

SUMMARY OF THE INVENTION

In the travel operation structure for a work vehicle described above, the operator may sometimes wish to stop travel in a swivel operation in which either the left or right side brake pedal is depressed. In this case, the operator must temporarily remove his foot from the depressed left or right side brake pedal, return his foot to a standby position, and again depress both side brake pedals once the left and right side brake pedals have aligned.

Operation is therefore complex, and improvement can be made regarding the ease with which travel can be stopped during a swivel operation. The present invention was developed in view of such problems.

The travel operation structure of a work vehicle according to the present invention comprises a pair of left and right side brake pedals disposed on either the left or right of a steering wheel; a hydro static transmission for changing the speed of travel; and a stop operation pedal disposed on the other of the left and right of the steering wheel; wherein the corresponding left or right side brake is applied when one of the pair of left and right side brake pedals is depressed, and when both the left and right side brake pedals are depressed, both the left and right side brakes operate, and travel is stopped; and when the stop operation pedal is depressed, operating oil of the continuously variable speed change device is directed into an oil tank, and the continuously variable speed change device is switched to a neutral stop position for blocking transmission of power to the travel device.

The stop operation pedal is provided on the side opposite the side of the steering wheel on which the left and right side brake pedals are provided. By depressing the stop operation pedal, the hydro static transmission is operated, and transmission of power to the travel device can be blocked.

According to the configuration described above, when it is necessary to stop travel during a swivel operation in which one of the left and right side brake pedals is being depressed with one foot, the travel device can be stopped by depressing the stop operation pedal with the other foot without removing the one foot from the left or right side brake pedal.

Since it is possible to keep the left or right side brake pedal depressed, it is possible for travel to be stopped by the braking force of the left or right side brake, considering that the swiveling state does not involve a high speed of travel.

Consequently, travel can be rapidly stopped by depressing the stop operation pedal with the other foot without releasing the one foot from the left or right side brake pedal.

Operability can thereby be enhanced by adopting such a configuration in which the stop operation pedal is disposed on the side opposite the side of the steering wheel on which the left and right side brake pedals are provided.

Preferably, the configuration described above further comprises a first operative connection member provided across the continuously variable speed change device and the stop operation pedal; wherein the first operative connection member switches the continuously variable speed change device to the neutral stop position when the stop operation pedal is depressed.

Since the pressurized operating oil of the continuously variable speed change device is directed into the oil tank when the stop operation pedal is depressed, the continuously variable speed change device is switched to the neutral position, drive power is not generated, and transmission of power to the travel device is blocked.

In other words, a simple structure for stopping the travel device can be formed by using means for directing the pressurized operating oil of the continuously variable speed change device into an oil tank as means for blocking the transmission of power from the continuously variable speed change device to the travel device.

Preferably, the configuration described above further comprises a second operative connection member provided across both of the side brakes and the continuously variable speed change device; wherein the second operative connection member applies both the left and right side brakes and switches the continuously variable speed change device to the neutral stop position when both the left and right side brake pedals are depressed.

Even when the left and right side brakes are operated to stop the travel device, the second operative connection member operates, and the continuously variable speed change device can be switched to the neutral stop position. Consequently, the transmission of power to the travel device by the continuously variable speed change device can be blocked, propulsive power is not overly exerted on the side brakes, and the brakes can be operated stably.

The transmission device of a work vehicle according to the present invention comprises a travel drive system for transmitting engine power to a travel device; an implement drive system for transmitting engine power to an external power takeoff shaft; a hydro static transmission for changing the speed of power to the travel device and transmitting the power to the travel drive system; a hydraulically operated PTO clutch for interrupting power transmission to the external power takeoff shaft by the implement drive system; a stop operation pedal able to switch between alternatives of a power blocking state of directing, to an oil tank, operating oil that is in a drive circuit to a hydraulic motor from a hydraulic pump of the hydro static transmission, and a state of canceling the power blocking state and driving the hydraulic motor; and swash plate angle controller for returning a swash plate of the hydro static transmission to a neutral position in response to a stop operation by the stop operation pedal; wherein the hydro static transmission and PTO clutch are operatively connected with respect to the stop operation pedal so that the hydro static transmission will be manipulated to the neutral position, and the PTO clutch will disengage as the stop operation pedal is depressed, and the PTO clutch will engage as the depressed stop operation pedal is released; and an operational timing is set so that the PTO clutch will disengage after the hydro static transmission returns to the neutral position when the stop operation pedal is depressed, and the PTO clutch will engage before travel by the hydro static transmission is initiated when the depressed stop operation pedal is released.

According to the configuration described above, the potential for non-tillable portions remaining in a cultivated field can be reduced in comparison to a case in which the PTO clutch disengages when the hydro static transmission has not yet returned to the neutral position, or travel by the hydro static transmission is initiated before the PTO clutch is engaged.

Consequently, interruption of the transmission of power by the hydro static transmission, and engagement and disengagement of the PTO clutch are operatively connected to each other, and operability can be enhanced.

Preferably, in the configuration described above, target speed setting means is provided for changing the angle of the swash plate of the hydro static transmission and setting a target speed, and the swash plate angle controller is configured so as to gradually change, at a pre-set speed increase rate, the speed at which the swash plate angle is changed until a swash plate angle that corresponds to the target speed is reached from the neutral position of the hydro static transmission.

According to this configuration, when the vehicle body is caused to start moving after stoppage of the hydro static transmission by the stop operation pedal, the swash plate angle can be gradually changed at a pre-set speed increase rate, and the vehicle body can be caused to gradually start moving.

Consequently, an advantage is gained in that travel of the vehicle body can be controlled so as to prevent sudden starts, merely by using the stop operation pedal to interrupt power transmission by the hydro static transmission or operate the engaging and disengaging of the PTO clutch.

Preferably, in the configuration described above, the stop operation pedal comprises a pedal provided separately from the pair of left and right side brake pedals.

Since the stop operation pedal is composed of a pedal provided separately from the pair of left and right side brake pedals, a structure that can be easily operated without the need for a large depressing force can be employed as the stop operation pedal.

Even during a swivel operation in which only one of the side brake pedals is in operation, there is no need to temporarily release the side brake pedal, and the operation of the stop operation pedal can be performed immediately.

Consequently, the stop operation pedal is a pedal that can be easily operated, and that has good operability due to being operable at any time.

DESCRIPTION OF THE PREFERRED EMBODIMENTS

First Embodiment

[Overall Structure of the Work Vehicle]

Figure 1:
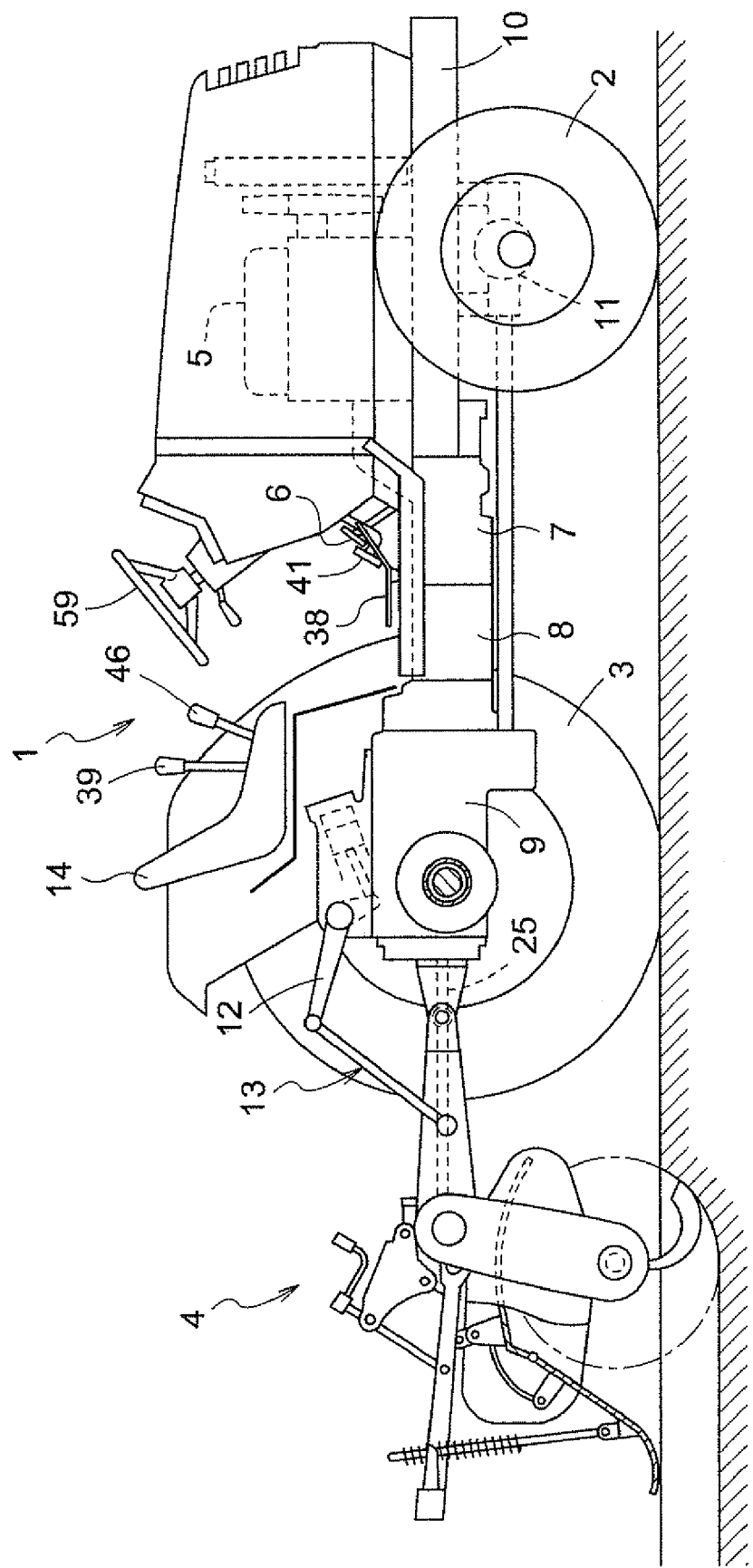
FIG. 1 is a full side view showing a tractor configured according to the specifications of a tiller according to a first embodiment.

FIG. 1 shows a tractor (as an example of the work vehicle) configured according to the specifications of a rotary tiller. In this tractor, a rotary tiller 4 that can be raised and lowered is connected at the rear of a four-wheel-drive tractor main unit 1 that is steered by a steering wheel 59 and a travel device provided with front wheels 2 and rear wheels 3. The vehicle body of the tractor main unit 1 is configured as a mono body in which an engine 5, a stop operation pedal 6 for stopping travel, a main speed change case 7, a mid case 8, and a transmission case 9 are directly coupled in series. A front axle case 11 is supported by a front frame 10 so as to be able to roll, the front frame 10 being coupled to the engine 5, the front wheels 2 are supported on the left and right of the front axle case 11 so as to be able to steer, and the rear wheels 3 are supported on the left and right of the transmission case 9. A link mechanism 13 driven upward and downward by a lift arm 12 is installed at the rear of the transmission case 9, and the rotary tiller 4 is coupled to the link mechanism 13.

[Transmission System]

Figure 2:
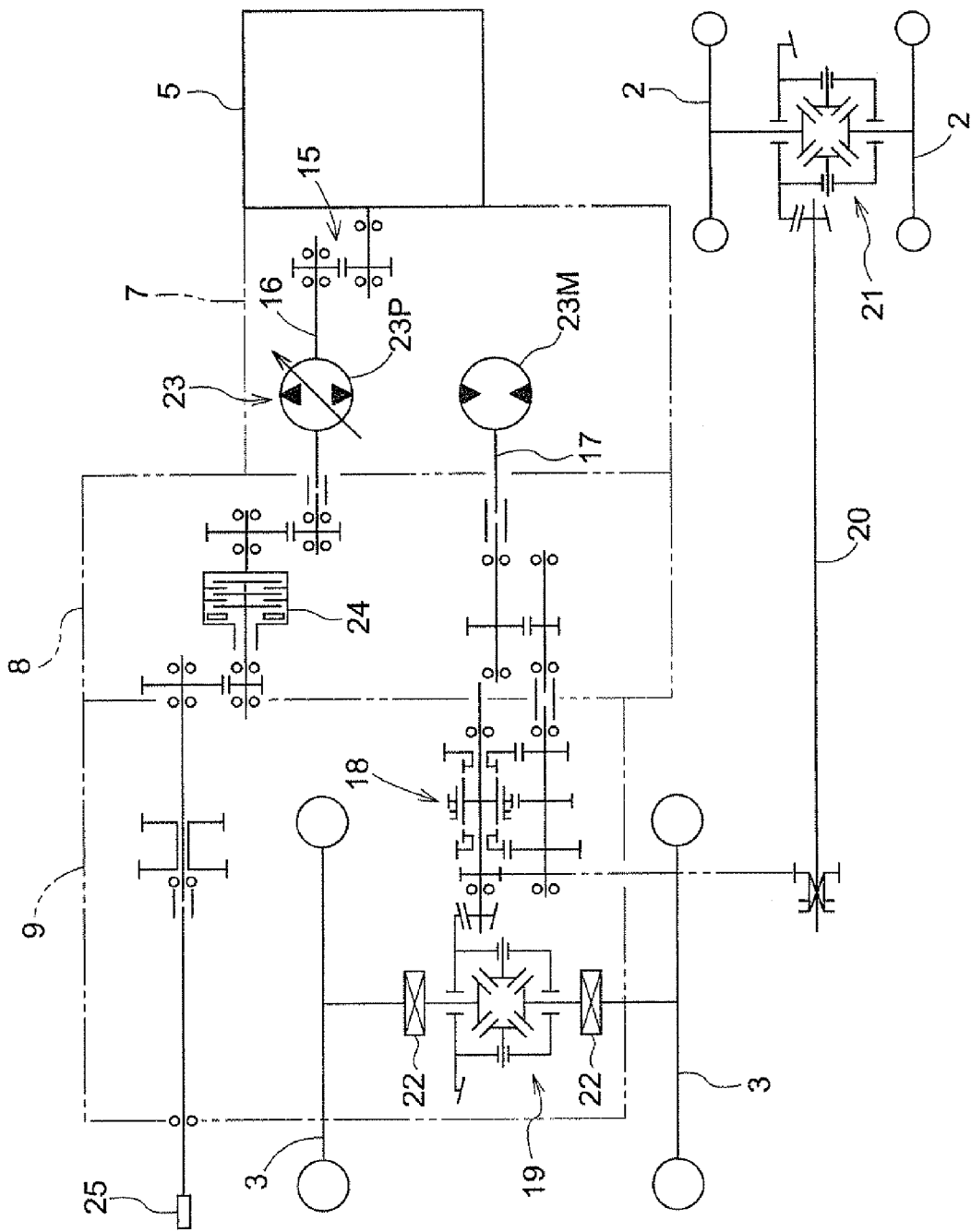
FIG. 2 is a schematic development view showing the transmission system.

FIG. 2 shows the transmission system in the tractor main unit 1. The output of the engine 5 is transmitted through a gear mechanism 15 to an input shaft 16 provided to the main speed change case 7, and the speed change power taken off from an output shaft 17 provided to the main speed change case 7 is changed into three speeds by a gear-type secondary speed change device 18, and then transmitted to the left and right rear wheels 3 via a rear differential device 19 and a side brake 22. A portion of the travel system power that was changed in speed by the secondary speed change device 18 is taken off from the bottom of the transmission case 9, transmitted to the front axle case 11 via a transmission shaft 20, and transmitted to the left and right front wheels 2 via a front differential device 21.

Figure 6:
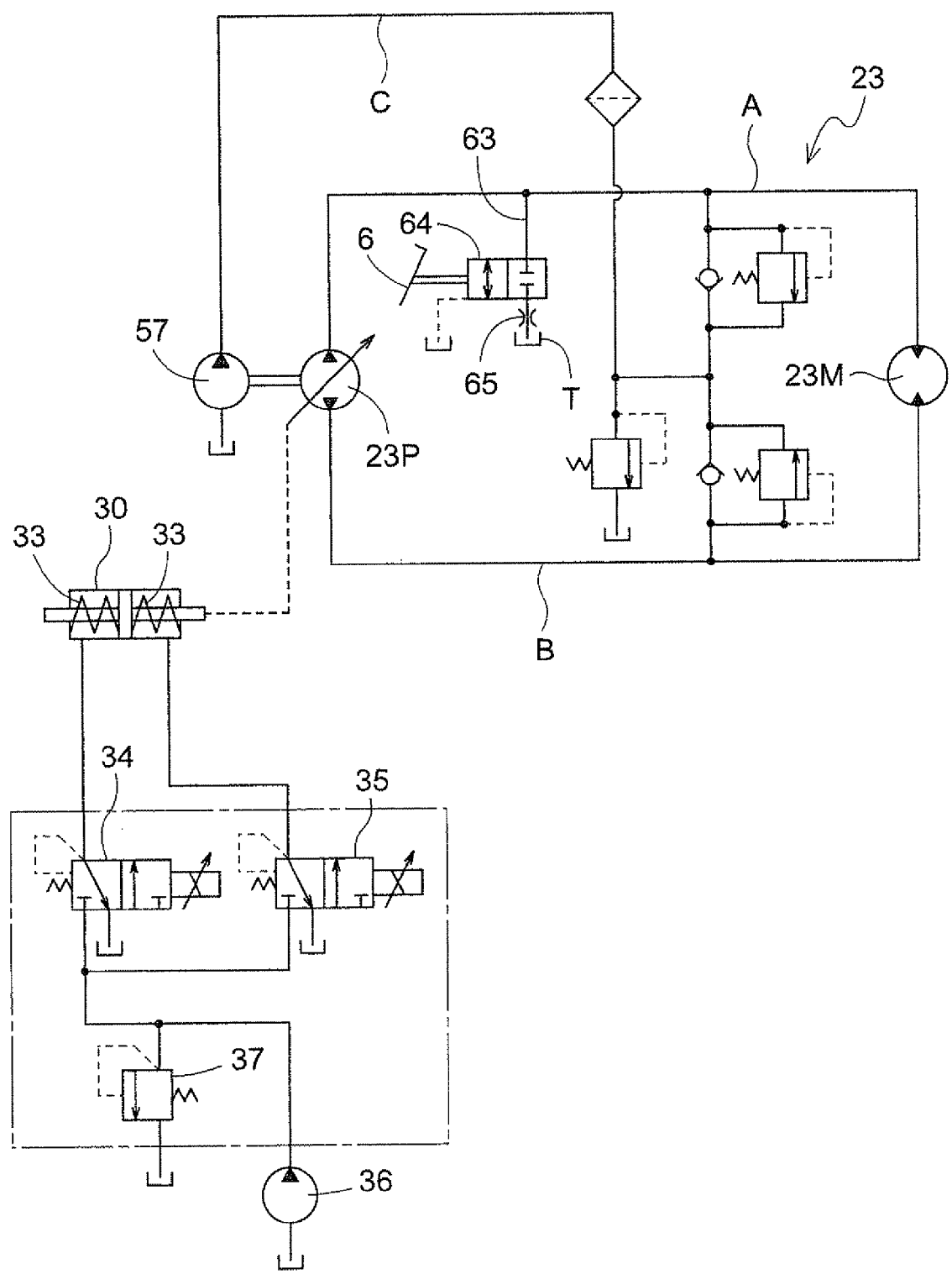
FIG. 6 is a hydraulic circuit diagram for the hydro static transmission.

A hydro static transmission (HST) 23 is housed in the main speed change case 7. As shown in FIGS. 2 and 6, the continuously variable speed change device 23 is composed of an axial-plunger-type variable-displacement hydraulic pump 23P and hydraulic motor 23M, and is configured so that by varying the swash plate angle in the hydraulic pump 23P that is rotatably driven at a constant speed by the input shaft 16, and varying the discharge direction and discharge quantity of discharged pressure oil, the output shaft 17 of the hydraulic motor 23M that receives the pressure oil can be caused to steplessly rotate positively or negatively.

The reference symbol C in the drawing refers to a charge circuit that is configured so as to charge pressure oil from a charging pump 57 into a closed circuit of the continuously variable speed change device 23.

As shown in FIG. 2, the input shaft 16 passes through the hydraulic pump 23P and extends to the rear, a portion of the constant-speed rotational power transmitted to the input shaft 16 is transmitted further to the rear via a PTO clutch 24 provided inside the mid case 8, and taken off from a PTO shaft 25 protruding at the rear of the transmission case 9, and the rotary tiller 4 is driven by constant-speed PTO power regardless of the travel speed.

Figure 3:
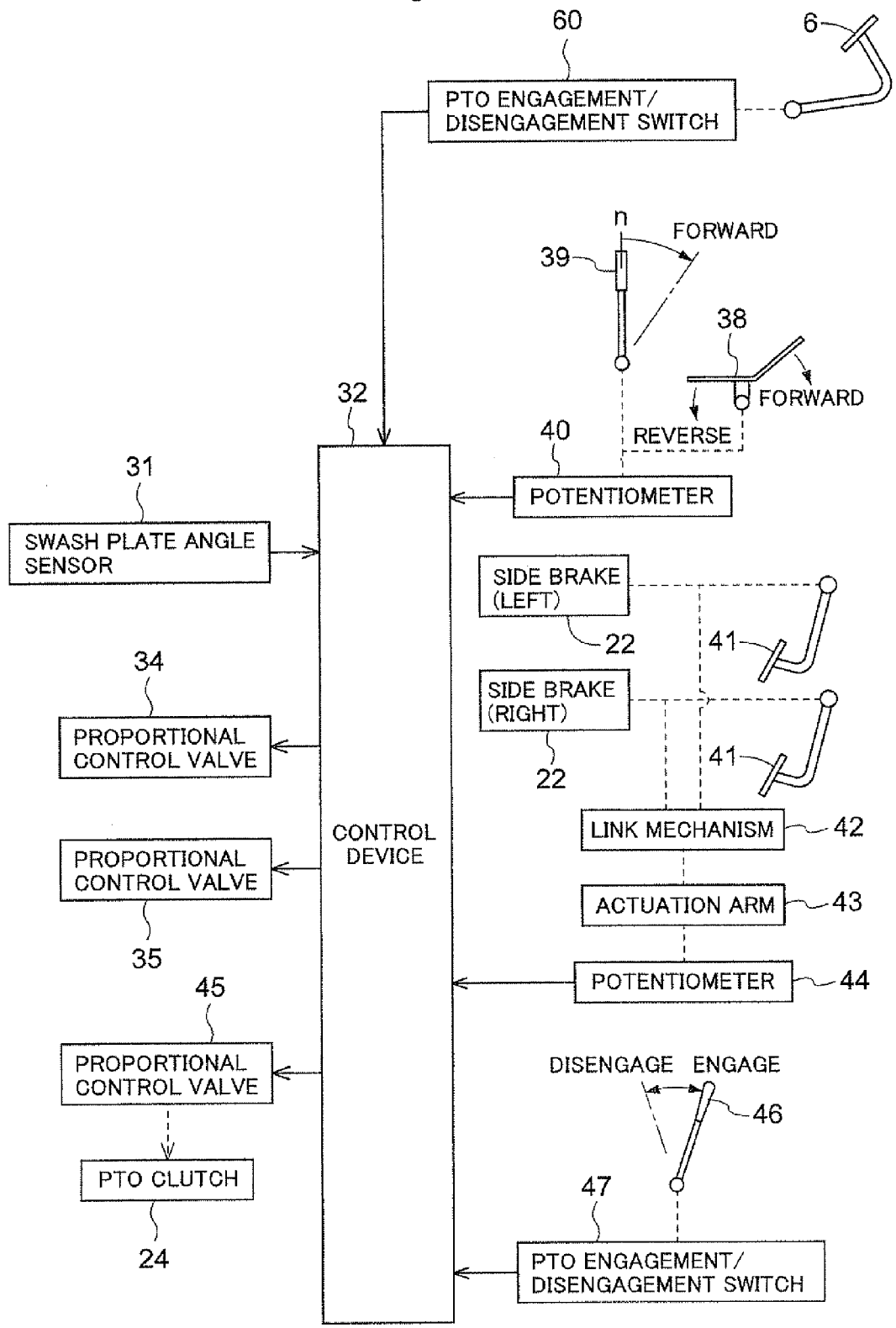
FIG. 3 is a control block view.

Speed changing of the continuously variable speed change device (HST) 23 is controlled by a hydraulic servo means, and the structure thereof is shown in FIGS. 3 and 6.

The swash plate angle of the hydraulic pump 23P in the continuously variable speed change device 23 can be varied positively and negatively by a double-action servo cylinder 30, and the swash plate angle is detected by a swash plate angle sensor 31 that uses a potentiometer, and inputted to a control device 32. The servo cylinder 30 is urged back by a pair of return springs 33 to the neutral stop position at which the swash plate angle is zero, and the servo cylinder 30 is moved back and forth by hydraulic control via a proportional control valve 34 for forward travel and a proportional control valve 35 for reverse travel that are connected to the control device 32.

The proportional control valves 34, 35 when controlled so as not to have power are urged to a return position in which the servo cylinder 30 is communicated with a tank, and when the proportional control valves 34, 35 are both in the return position, the servo cylinder 30 is free, and the continuously variable speed change device 23 returns to the neutral stop position. A relief valve 37 is provided to a pressure oil feeding channel from a pump 36 to the proportional control valves 34, 35, and the maximum pressure of the system pressure in the hydraulic servo means is limited.

[Operation System]

Figure 5:
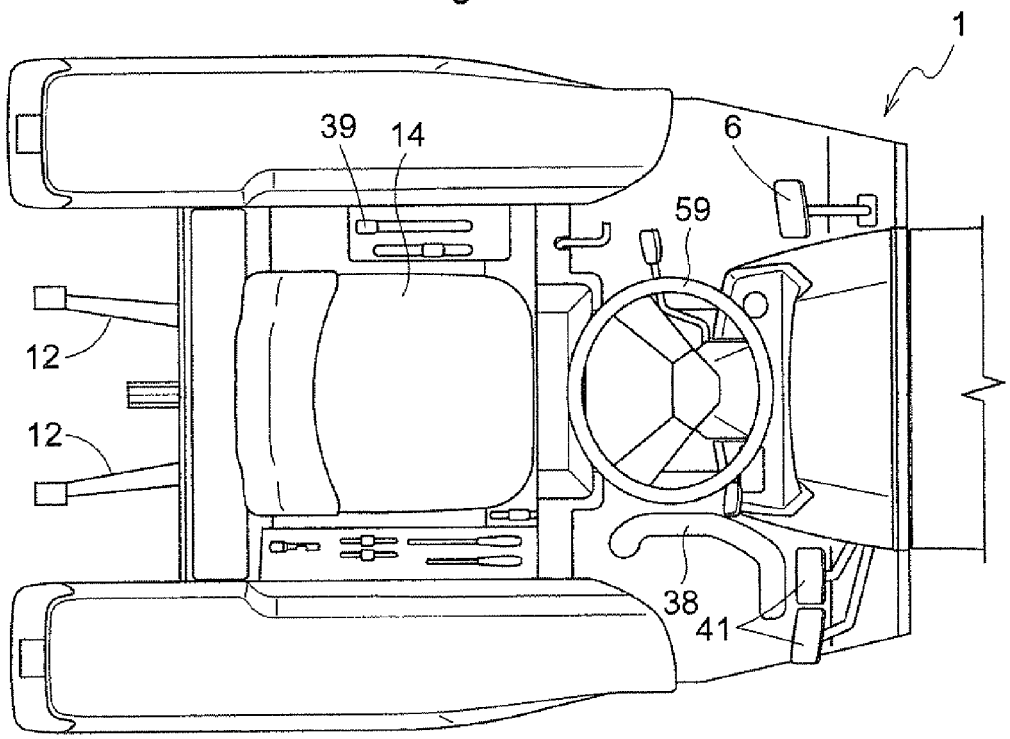
FIG. 5 is a plan view showing the arrangement of the stop operation pedal.

A speed change pedal 38 and a speed change lever 39 are installed in the tractor main unit 1. As shown in FIGS. 1 and 5, the speed change pedal 38 is provided at the driver's feet to the right of a driver seat 14, and the speed change lever 39 is provided to the left of the driver seat 14. As shown in FIG. 3, the speed change pedal 38 can be depressed forward or back, and is mechanically urged back to the neutral stop position by a cam mechanism not shown in the drawing. The depression position of the speed change pedal 38 is detected by a potentiometer 40 and inputted to the control device 32, and the operation of the proportional control valves 34, 35 is controlled based on depression position information of the speed change pedal 38 detected by the potentiometer 40, and feedback information from the swash plate angle sensor 31. In other words, the servo cylinder 30 moves back and forth according to the depression direction and depression amount of the speed change pedal 38, a swash plate angle that corresponds to the depression of the speed change pedal 38 is produced, forward and reverse speed changing is performed steplessly, the speed change pedal 38 automatically returns to the neutral stop position when no longer depressed, and the output of propulsive force for travel is stopped to stop travel.

The speed change lever 39 is mechanically operatively connected so that the speed change pedal 38 can be operated only in the forward speed change direction, and is supported so as to be able to be retained by friction in any operation position, and in a state in which the speed change lever 39 is retained in the operative connection release position n, the operative connection between the speed change lever 39 and the speed change pedal 38 is released, and the speed change pedal 38 can be depressed throughout the entire range from forward to reverse. The speed change pedal 38 is operated in the forward depression direction (forward speed increase direction) as the speed change lever 39 is moved forward from the operative connection release position n, and the speed change lever 39 is frictionally retained in any operation position of the forward speed change range, whereby the speed change pedal 38 is prevented from returning to the neutral stop position and retained in the arbitrary forward speed change range, and forward travel occurs at a constant speed according to the arbitrary speed that corresponds to the operation position of the speed change lever 39. In a state in which the speed change pedal 38 is retained in the middle position of the forward speed change range by the speed change lever 39, the speed change pedal 38 is allowed to be depressed in the direction of a higher forward speed increase, and the speed change pedal 38 returns to the speed set by the speed change lever 39 when no longer depressed.

[Side Brakes]

A pair of left and right side brake pedals 41 separately link-coupled to the left and right side brakes 22, respectively, are provided parallel to each other in the vicinity of the speed change pedal 38, and the left and right side brake pedals 41 are coupled and connected to an actuation arm 43 via a link mechanism 42. The link mechanism 42 is configured so that the actuation arm 43 is not rotated when only one of the side brake pedals 41 is depressed, and so that the actuation arm 43 is rotated an angle commensurate with the depression amount only when both of the side brake pedals 41 are simultaneously depressed. The rotation angle of the actuation arm 43 is detected by a potentiometer 44 and inputted to the control device 32.

The link mechanism 42 for operatively connecting the left and right side brakes 22 and the left and right side brake pedals 41 is referred to herein as the second operative connection mechanism.

[PTO Clutch]

The PTO clutch 24 is composed of a multi-plate friction clutch that is engaged when oil pressure is applied, and disengaged by spring force when application of oil pressure is released, and the oil pressure applied is controlled via an electromagnetic proportional control valve 45 connected to the control device 32. A PTO clutch lever 46 is provided beside the driver seat 14, the operation position of the PTO clutch lever 46 is detected by a PTO engagement/disengagement switch 47; and the detection information is inputted to the control device 32. When the PTO clutch lever 46 is placed in the "disengage" position, the proportional control valve 45 is controlled so that application of oil pressure is released, and when the PTO clutch 24 is disengaged and the PTO clutch lever 46 is placed in the "engage" position, the proportional control valve 45 is controlled so that a predetermined high oil pressure is applied, and the PTO clutch 24 becomes engaged.

When the left and right side brake pedals 41 are depressed at the same time, the braking force of the side brakes 22 increases as the depression amount increases, and the hydraulic servo means for speed change operation and the proportional control valve 45 for engaging and disengaging the PTO clutch are controlled as described below.

Figure 4:
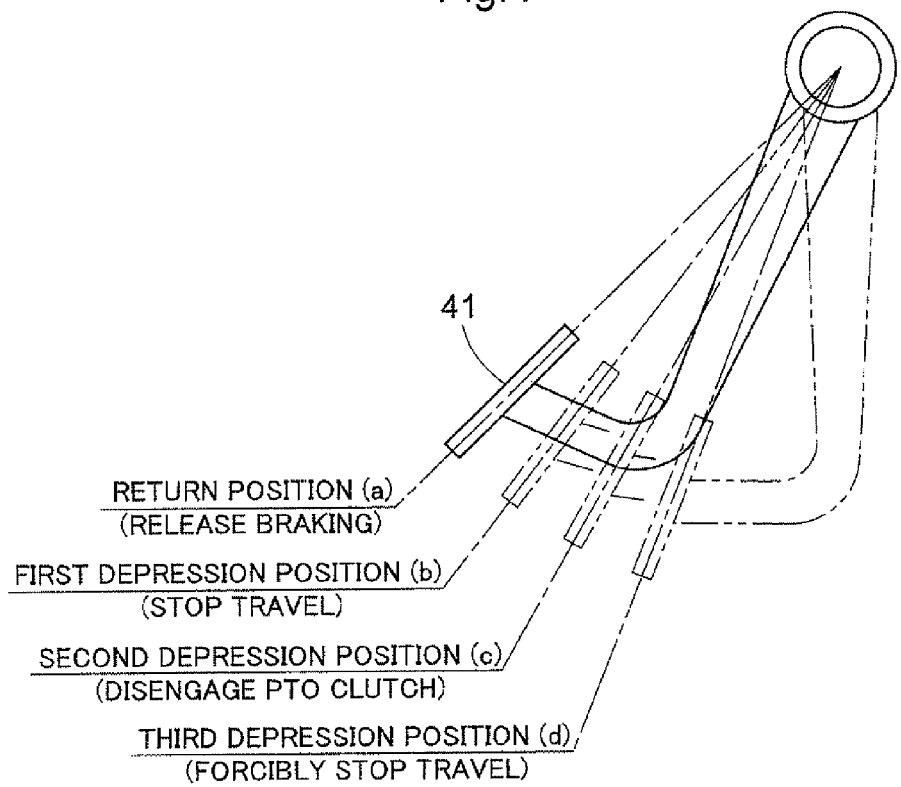
FIG. 4 is a side view showing a side brake pedal.

In a state in which the speed change lever 39 is retained in an arbitrary forward position, a forward speed is set, and the PTO clutch lever 46 is placed in the "engage" position, when depression of the left and right side brake pedals 41 is released, and the left and right side brake pedals 41 return to the return position (a) as shown in FIG. 4, both side brakes 22 are in a released state, the powering of the proportional control valve 34 for forward travel is controlled so that the servo cylinder 30 is actuated to a predetermined position, and the continuously variable speed change device 23 is retained in a forward speed change state that corresponds to the operation position of the speed change lever 39. A high oil pressure is fed to the PTO clutch 24 to engage the clutch.

When both of the side brake pedals 41 are simultaneously depressed from this state, the left and right side brakes 22 exert braking force according to the depression amount, the servo cylinder 30 is controlled so as to actuate in the deceleration direction on the basis of the rotation angle of the actuation arm 43, and the travel speed gradually decreases from the forward speed set by the speed change lever 39.

When both side brake pedals 41 are simultaneously depressed to a first pre-set depression position (b), a state occurs in which electrical power to both the proportional control valves 34, 35 is cut regardless of the retention of the speed change lever 39 in the forward speed change range, the servo cylinder 30 is returned to the neutral stop position, the continuously variable speed change device 23 is placed in the neutral stop state by priority, and travel is stopped.

As both side brake pedals 41 are further depressed past the first depression position (b), the proportional control valve 45 is controlled based on the rotation angle of the actuation arm 43, the oil pressure applied to the PTO clutch 24 is gradually reduced, the frictional force gradually decreases, and a semi-engaged state of the clutch occurs. When both side brake pedals 41 are depressed to a second pre-set depression position (c), the frictional force is eliminated, and the PTO clutch 24 is in a completely disengaged state.

When both side brake pedals 41 are depressed to a third depression position (d) at a limit position past the first depression position (b), the relief valve 37 of the hydraulic servo means is forced open on the basis of the rotation of the actuation arm 43, the system pressure of the hydraulic servo means decreases to zero, and regardless of the control operation state of the proportional control valves 34, 35 for travel speed change, the supply of pressure oil to the servo cylinder 30 is removed, and the continuously variable speed change device 23 is returned to the neutral stop position.

When both side brake pedals 41 are depressed all the way to the third depression position (d), since the supply of pressure oil to the servo cylinder 30 is thus forced off, and the continuously variable speed change device 23 is returned to the neutral stop position, in the unlikely event that the proportional control valves 34, 35 do not return to the return position due to a failure of the electrical system during travel, the continuously variable speed change device 23 can be returned to the neutral stop position and travel stopped merely by depressing both side brake pedals 41 to the depression limit thereof.

The abovementioned control based on depression of both side brake pedals 41 can be effectively utilized as described below in the work of rotary tilling.

Although not shown in the drawings, when tilling is started from a corner of the field, the tractor main unit 1 is first moved to the desired position of the causeway ridge, and both side brake pedals 41 are depressed to at least the second depression position (c) to stop travel. At this time, the speed change lever 39 is retained at the desired forward speed, and the PTO clutch lever 46 is placed in the "engage" position. As described above, in a state in which both side brake pedals 41 are depressed to at least the second depression position (c), adequate travel braking is applied, the continuously variable speed change device 23 is in the neutral return state in which propulsive force is not outputted, and the PTO clutch 24 is disengaged.

As both side brake pedals 41 are returned from this state, the PTO clutch 24 gradually engages in a state in which braking is still in effect to stop travel, the rotary tiller 4 gradually begins to rotate, and the rotary tiller 4 rotating in the down cut direction is lowered into the field while both side brake pedals 41 are still kept depressed to the pedal depression position at which the rotary tiller 4 rotates at low speed.

In this case, a propulsive force is generated by recoil from the tiller as the rotary tiller 4 enters the field, but because both side brake pedals 41 are still depressed, and the tractor main unit 1 is braked, the tractor main unit 1 is not pushed forward by the propulsive force created by the rotary tiller 4.

Once the rotary tiller 4 has been lowered to the desired tilling depth, by slowly returning both side brake pedals 41, travel braking is gradually released, the continuously variable speed change device 23 is controlled so as to increase speed to the forward speed set by the speed change lever 39, and forward travel can occur while the desired tilling depth is maintained.

When both side brake pedals 41 are depressed during rotary tilling, the travel speed is first automatically decreased in conjunction with the depression of both side brake pedals 41, and the continuously variable speed change device 23 is placed in the neutral state and travel stopped when the side brake pedals 41 are depressed to the travel stop position (b). When the side brake pedals 41 are further depressed from the travel stop position (b) to the PTO disengagement position (c), the PTO clutch 24 automatically disengages without operation of the PTO clutch lever 46, and the rotary tiller 4 stops. Consequently, travel can be stopped at a predetermined position without the tractor main unit 1 being pushed forward by the recoil of the rotary tiller 4, merely by depressing both side brake pedals 41 during rotary tilling.

The operative connection of a stop operation pedal 60 and the hydro static transmission 23 will next be described. As shown in FIG. 6, a return oil path 63 is provided across the oil tank T and a first oil path A that is at high pressure during forward travel in the continuously variable speed change device 23, an unload valve 64 is provided to the return oil path 63, and a throttle valve 65 is provided between the unload valve 64 and the oil tank T in the return oil path 63. The oil pressure of the first oil path A of the continuously variable speed change device 23 is released by the unload valve 64, and transmission of power to the travel device is blocked. The specific structure is as described below.

Figure 7:
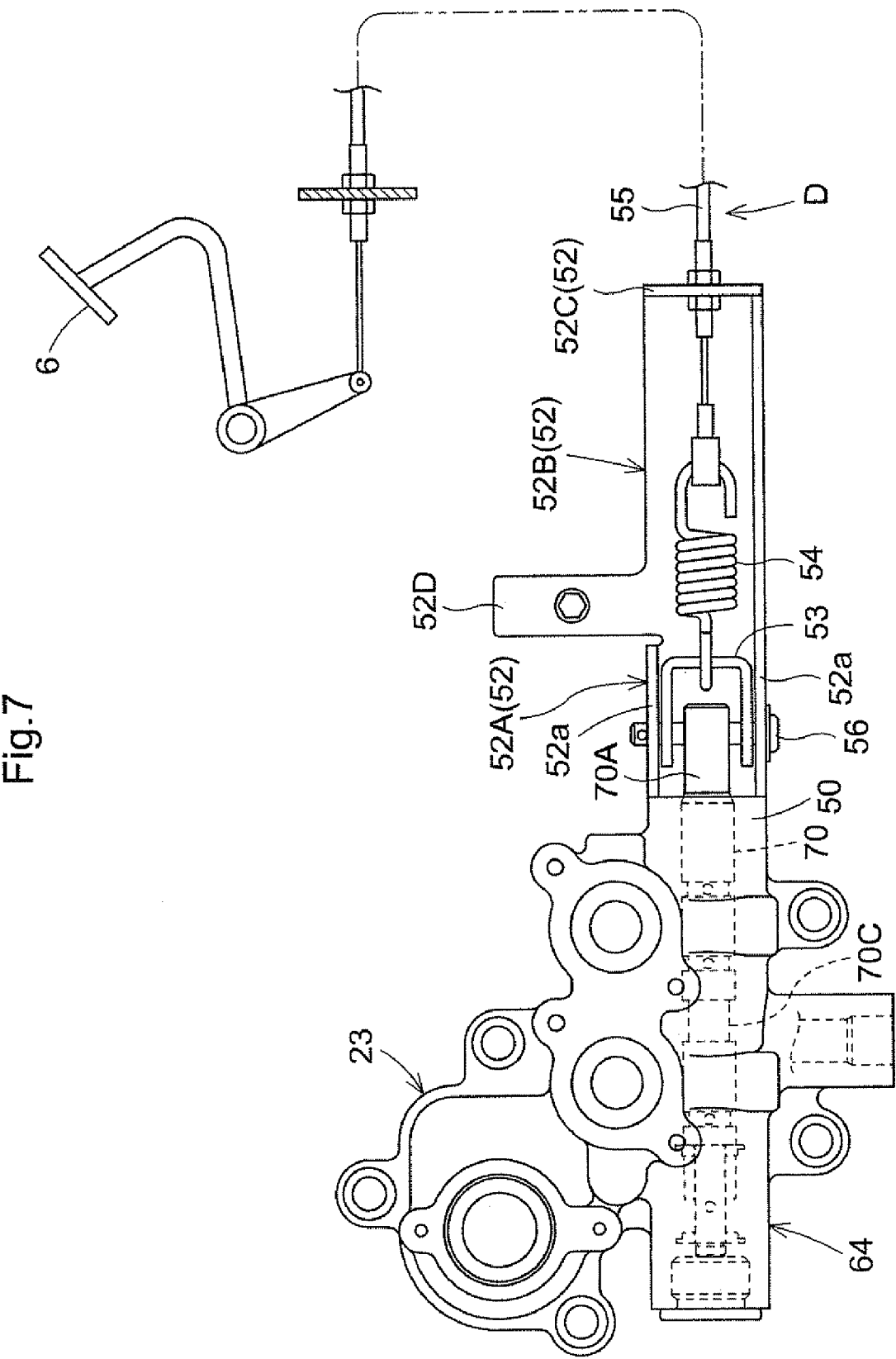
FIG. 7 is a plan view showing a first operative connection mechanism for operatively connecting the hydro static transmission and the stop operation pedal.
Figure 8:
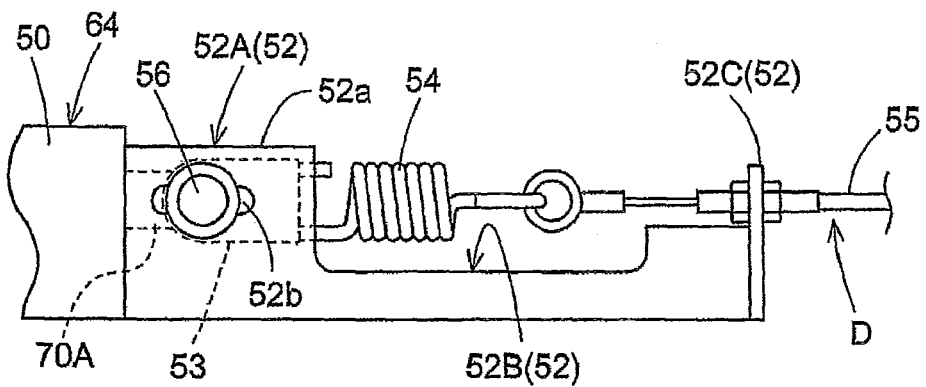
FIG. 8 is a side view showing a support bracket.

The unload valve 64 will be described. As shown in FIGS. 7 through 9, a hydraulic port block 50 is attached to a side surface of the continuously variable speed change device 23, and this hydraulic port block 50 is formed as a thin-walled flat plate. Although not shown in the drawing, the first oil path A and other components of the continuously variable speed change device 23, and a second oil path B that is the low-pressure side during forward travel are provided along the flat side surface in the hydraulic port block 50, and are formed within the wall thickness of the hydraulic port block 50.

A spool accommodation path 50A and the unload valve 64 are provided in the wall thickness of the hydraulic port block 50, and a spool 70 is accommodated in the spool accommodation path 50A. The spool 70 causes a distal end part 70A to protrude further than the hydraulic port block 50, and is operatively connected to the stop operation pedal 60. Although not shown in the drawing, the middle portion 70C of the spool 70 has a smaller diameter than the spool accommodation path 50A, and an escape path is formed in the middle position of the spool accommodation path 50A. The escape path is connected to the oil tank T. The unload valve 64 is formed by opening and closing a gap formed by the external peripheral surface of the spool 70 and the internal peripheral surface of the spool accommodation path 50A. The spool accommodation path 50A and the escape path are referred to as the return oil path 63 from the first oil path A to the oil tank T.

Figure 9A:
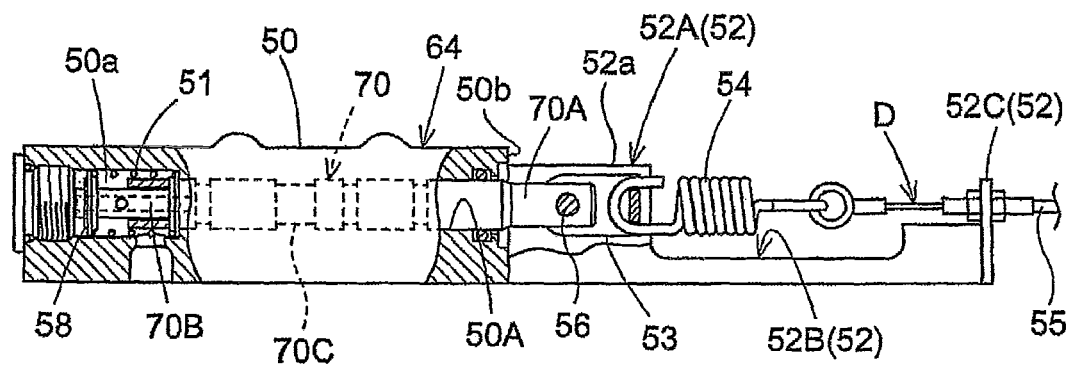
FIG. 9A is a side view showing a state in which the stop operation pedal is not depressed, a spool for neutral operation is pulled in, and the hydro static transmission maintains a speed position other than the neutral stop position.
Figure 9B:
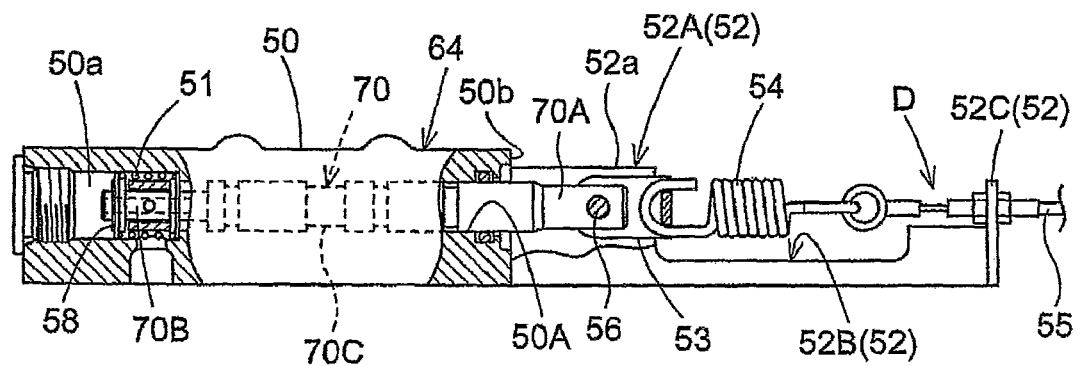
FIG. 9B is a side view showing a state in which the stop operation pedal is depressed, the spool for neutral operation is pulled out, and the hydro static transmission is switched to the neutral stop position.

As shown in FIG. 9A, when the distal end part 70A of the spool 70 is pulled back inside from the hydraulic port block 50, the escape path is not communicated with the first oil path A. When the spool 70 is pulled out sideways from this non-communicated state, as shown in FIG. 9B, the middle portion 70C of the spool 70 is positioned in a range that spans the escape path and a large-diameter opening part opened in the first oil path A.

Pressurized operating oil then moves from the first oil path A through the gap formed between the middle portion 70C of the spool 70 and the internal peripheral surface of the spool accommodation path 50A, reaches the escape path, and is directed into the oil tank T from the escape path.

The structure for pulling out the spool 70 will be described. As shown in FIGS. 9A and 9B, a large-diameter accommodation path 50a is formed at one end of the spool accommodation path 50A of the hydraulic port block 50, and an urging spring 51 is installed in the large-diameter accommodation path 50a. The urging spring 51 is provided between a step surface of the large-diameter accommodation path 50a and a catch disk 58 attached to a proximal end part 70B of the spool 70. The spool 70 is urged back into the spool accommodation path 50A by the urging spring 51.

The distal end part 70A of the spool 70 protrudes further than a side surface 50b of the hydraulic port block 50, a support bracket 52 is connectedly provided to the side surface 50b, and the support bracket 52 is attached to the transmission case 9 via an extension bracket part 52D. The support bracket 52 is composed of a proximal-end bracket portion 52A having the cross-sectional shape of a channel, a distal-end bracket portion 52B having an angled cross-section toward the distal end from the proximal-end bracket portion 52A, and a distal-end flange portion 52C of the distal-end bracket portion 52B.

As shown in FIGS. 7 through 9, a first operative connection mechanism D is attached to the support bracket 52. The first operative connection mechanism D is composed of a connector 53 connected to the proximal-end portion 52A of the support bracket 52; a stroke absorption spring 54 hooked onto the connector 53; and a release wire mechanism 55 for connecting the stroke absorption spring 54 and the stop operation pedal 60.

The connector 53 is provided so as to be able to slide along the inside surface of the proximal-end portion 52A of the support bracket 52, and is connected to the proximal-end portion 52A and the spool 70 by a connecting bolt 56 that passes through the proximal-end portion 52A, the connector 53, and the distal-end portion 70A of the spool 70.

An elongated hole 52b that allows the connecting bolt 56 to move is formed in a starting flange part 52a in the distal-end portion 52A through which the connecting bolt 56 passes.

Through a configuration such as described above, the first operative connection mechanism D and other components operate as described below as the stop operation pedal 60 is depressed.

(1) As shown in FIG. 9A, when the stop operation pedal 60 is not being depressed, the spool 70 is in a retracted state of being pulled into the hydraulic port block 50. The connecting bolt 56 for connecting the spool 70 and the connector 53 is pulled toward one end of the elongated hole 52b formed in the proximal-end portion 52A.

(2) As shown in FIG. 9B, when the stop operation pedal 60 is depressed from the standby position, the release wire mechanism 55 for operative connection is pulled, and the connector 53 and spool 70 are pulled out via the stroke absorption spring 54.

In this pulled-out state of the spool 70, the first oil path A and the oil tank T are communicated, and the continuously variable speed change device 23 is switched to the neutral stop state.

When the continuously variable speed change device 23 is switched to the neutral stop position, transmission to the front and rear wheels 2, 3 is blocked. During a pivot operation in which the left or right side brake pedal 41 is depressed, since the front and rear wheels 2, 3 are at low speed, and the left or right side brake pedal 41 is being depressed, the travel speed is low, and the tractor is stopped by the interaction of resistance with the field.

(3) In the state shown in FIG. 9B, the connecting bolt 56 and the connector 53 slide with respect to the support bracket 52, and the connecting bolt 56 is held by the distal end of the elongated hole 52b. The connecting bolt 56 being held by one end of the elongated hole 52b in this manner prevents the spool 70 from being pulled out more than a set amount, and the extension of the release wire mechanism 55 by further depression of the stop operation pedal 60 is absorbed by the extension of the stroke absorption spring 54, and there is no movement of the spool 70.

As shown in FIG. 3, a PTO engagement/disengagement switch 60 as an operation position detection means for detecting the operation position of the stop operation pedal 6 is provided to the stop operation pedal 6, as well as to the PTO clutch lever 46, and when the stop operation pedal 6 is depressed, the continuously variable speed change device 23 is switched to the neutral stop position as described above, output occurs from the control device 32 to the proportional control valve 45 on the basis of detection from the PTO engagement/disengagement switch 60, and the PTO clutch 24 is switched to the disengaged state in conjunction with the depression of the stop operation pedal 6.

Other Modes of the First Embodiment (1) A main clutch (not shown) may be provided between the engine 5 and the gear mechanism 15. Providing a main clutch in this manner makes it possible to engage and disengage power transmission to the travel system and PTO system by operating a main clutch pedal (not shown). In this case, the main clutch pedal and the stop operation pedal 6 may be provided in linked fashion to the left of the steering wheel 59.

(2) In the embodiment described above, the stop operation pedal 6 and the unload valve 64 are operatively connected by a wire, but a configuration may be adopted in which the operation state of the stop operation pedal 6 is detected by an electric sensor, optical sensor, or other sensor, and the spool 70 of the unload valve 64 is driven by an actuator.

(3) In a configuration in which the continuously variable speed change device 23 is switched to the neutral stop position when the stop operation pedal 6 is operated, a configuration may be adopted in which the operation state of the stop operation pedal 6 is detected by an electric sensor, optical sensor, or other sensor, and based on the detection result, electrical power to the proportional control valves 34, 35 is cut, and the servo cylinder 30 is placed in the neutral stop position.

(4) The return oil path 63 and the unload valve 64 may be connected across both the first oil path A and the second oil path B.

Second Embodiment

[Overall Structure of the Work Vehicle]

Figure 10:
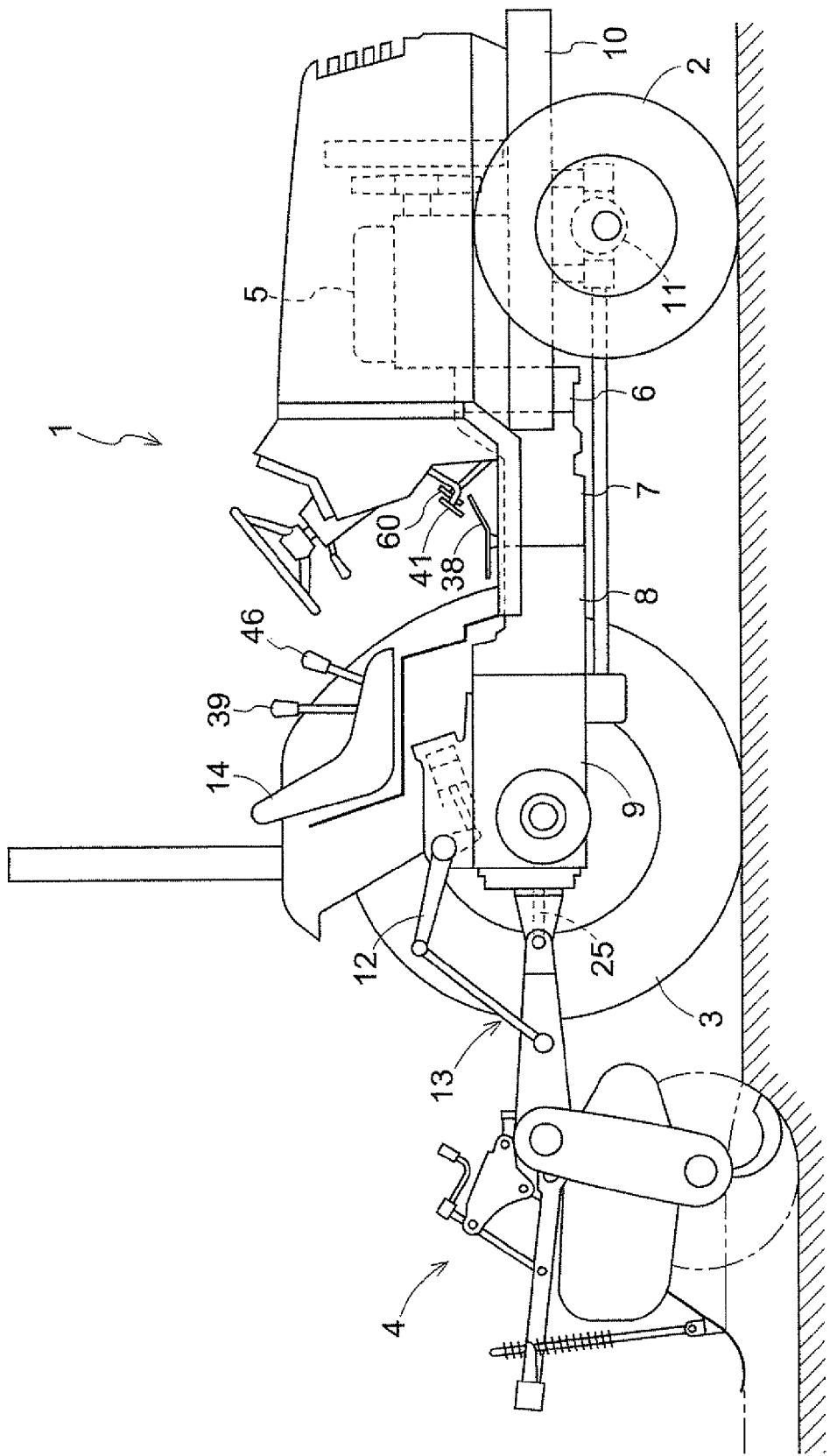
FIG. 10 is a full side view showing a tractor configured according to the specifications of a tiller according to a second embodiment.

FIG. 10 shows a tractor configured according to the specifications of a rotary tiller, as an example of a work vehicle that is provided with the transmission device of the present invention.

In this tractor, a rotary tiller 4 that can be raised and lowered is connected at the rear of a four-wheel-drive tractor main unit 1 that is provided with front wheels 2 and rear wheels 3. The vehicle body of the tractor main unit 1 is configured as a mono body in which an engine 5, a main clutch housing 6, a main speed change case 7, a mid case 8, and a transmission case 9 are directly coupled in series. A front axle case 11 is supported by a front frame 10 so as to be able to roll, the front frame 10 being coupled to the engine 5, the front wheels 2 are supported on the left and right of the front axle case 11 so as to be able to steer, and the rear wheels 3 are supported on the left and right of the transmission case 9. A link mechanism 13 driven upward and downward by a lift arm 12 is installed at the rear of the transmission case 9, and the rotary tiller 4 is coupled to the link mechanism 13.

[Structure of the Transmission System]

Figure 11:
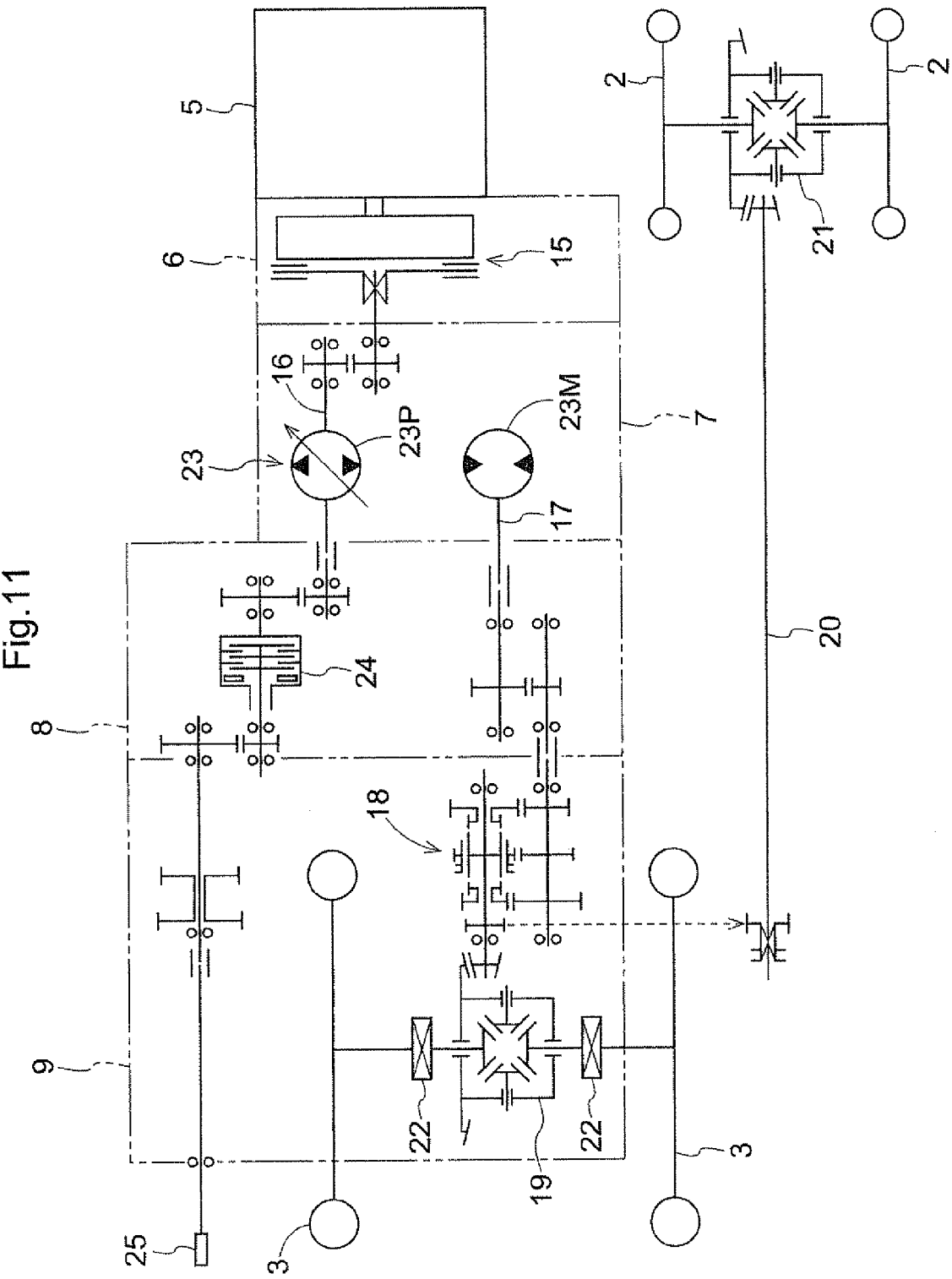
FIG. 11 is a line diagram showing the transmission system.

FIG. 11 shows the transmission system in the tractor main unit 1. The output of the engine 5 is transmitted through a main clutch 15 to an input shaft 16 provided to the main speed change case 7, and the speed change power taken off from an output shaft 17 provided to the main speed change case 7 is changed into three speeds by a gear-type secondary speed change device 18, and then transmitted to the left and right rear wheels 3 via a rear differential device 19 and a side brake 22. A portion of the travel system power that was changed in speed by the secondary speed change device 18 is taken off from the bottom of the transmission case 9, transmitted to the front axle case 11 via a transmission shaft 20, and transmitted to the left and right front wheels 2 via a front differential device 21.

A hydro static transmission (HST) 23 is housed in the main speed change case 7. The continuously variable speed change device 23 is composed of an axial-plunger-type variable-displacement hydraulic pump 23P and hydraulic motor 23M, and is configured so that by varying the swash plate angle in the hydraulic pump 23P that is rotatably driven at a constant speed by the input shaft 16, and varying the discharge direction and discharge quantity of discharged pressure oil, the output shaft 17 of the hydraulic motor 23M that receives the pressure oil can be caused to steplessly rotate positively or negatively.

The input shaft 16 passes through the hydraulic pump 23P and extends to the rear, a portion of the constant-speed rotational power transmitted to the input shaft 16 is transmitted further to the rear via a PTO clutch 24 provided inside the mid case 8, and taken off from a PTO shaft 25 protruding at the rear of the transmission case 9, and the rotary tiller 4 is driven by constant-speed PTO power regardless of the travel speed.

Figure 12:
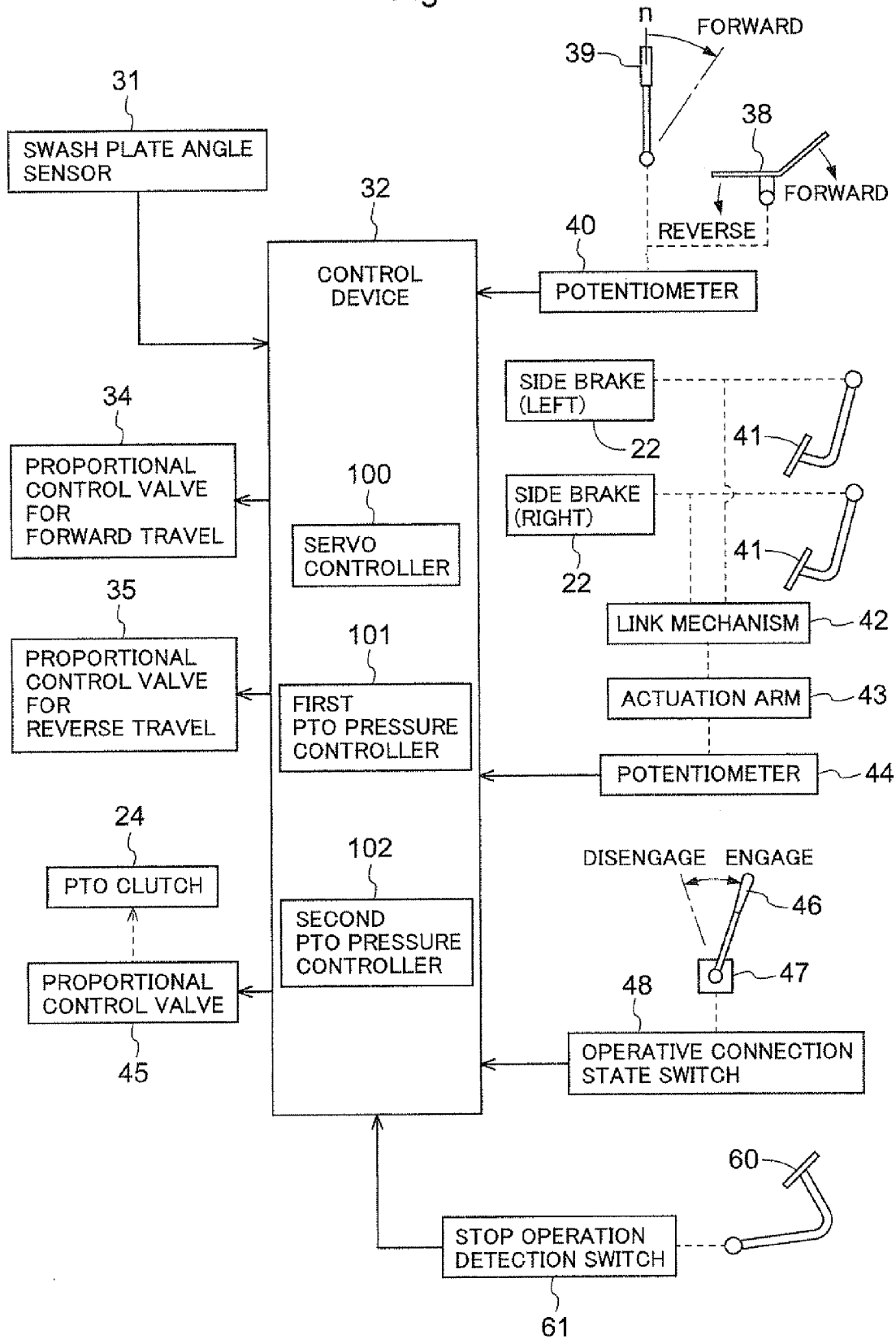
FIG. 12 is a block diagram showing the control system.
Figure 14:
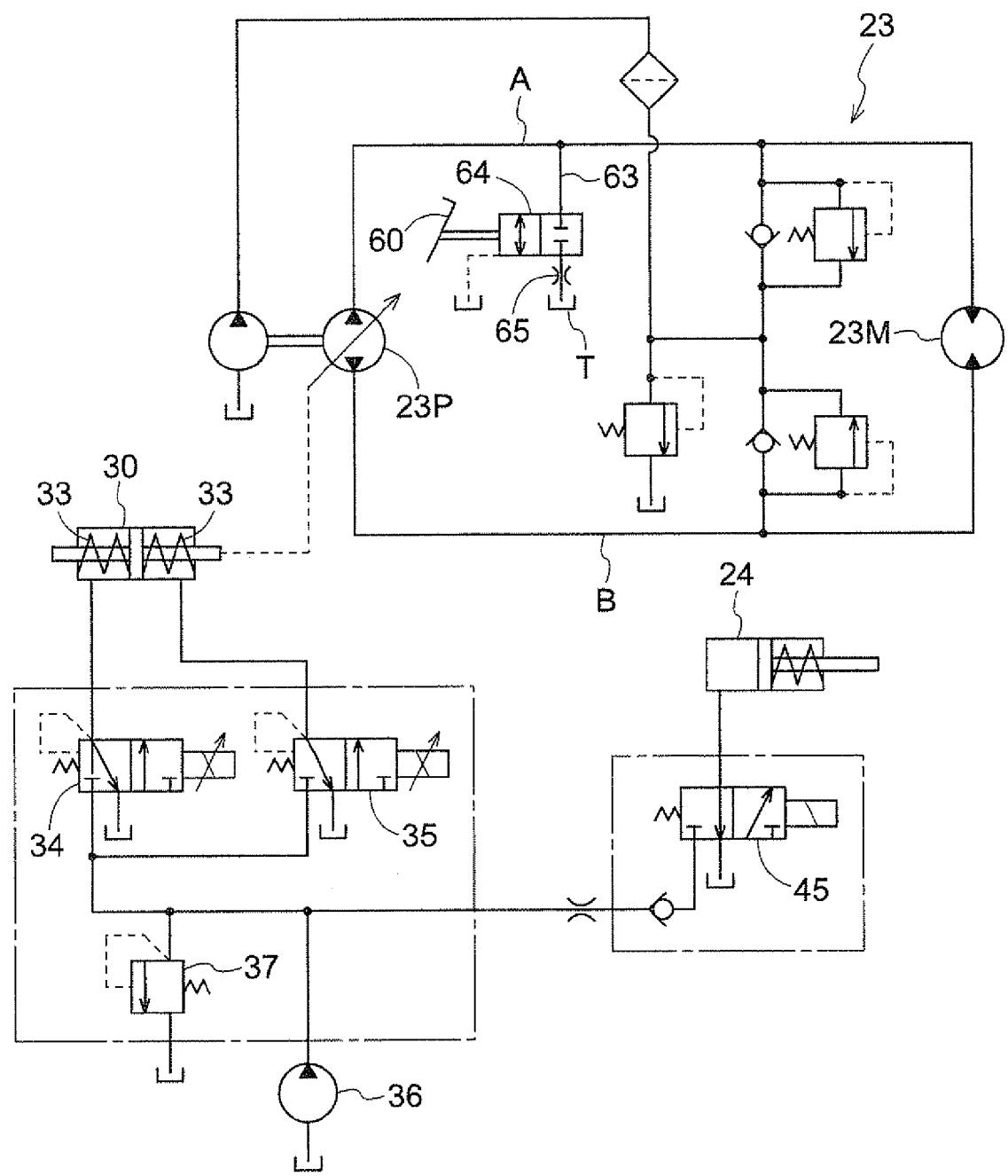
FIG. 14 is a hydraulic circuit diagram for the hydro static transmission.

Speed changing of the continuously variable speed change device (HST) 23 is controlled by a hydraulic servo means, and the structure thereof is shown in FIGS. 12 and 14.

The swash plate angle of the hydraulic pump 23P in the continuously variable speed change device 23 can be varied positively and negatively by a double-action servo cylinder 30, and the swash plate angle is detected by a swash plate angle sensor 31 that uses a potentiometer, and inputted to a control device 32. The servo cylinder 30 is urged back by a pair of return springs 33 to the neutral stop position at which the swash plate angle is zero, and the servo cylinder 30 is moved back and forth by hydraulic control via a proportional control valve 34 for forward travel and a proportional control valve 35 for reverse travel that are connected to the control device 32.

The proportional control valves 34, 35 when controlled so as not to have power are urged to a return position in which the servo cylinder 30 is communicated with a tank, and when the proportional control valves 34, 35 are both in the return position, the servo cylinder 30 is free, and the continuously variable speed change device 23 returns to the neutral stop position. A relief valve 37 is provided to a pressure oil feeding channel from a pump 36 to the proportional control valves 34, 35, and the maximum pressure of the system pressure in the hydraulic servo means is limited.

[Structure of the Speed Change Operation System]

Figure 13:
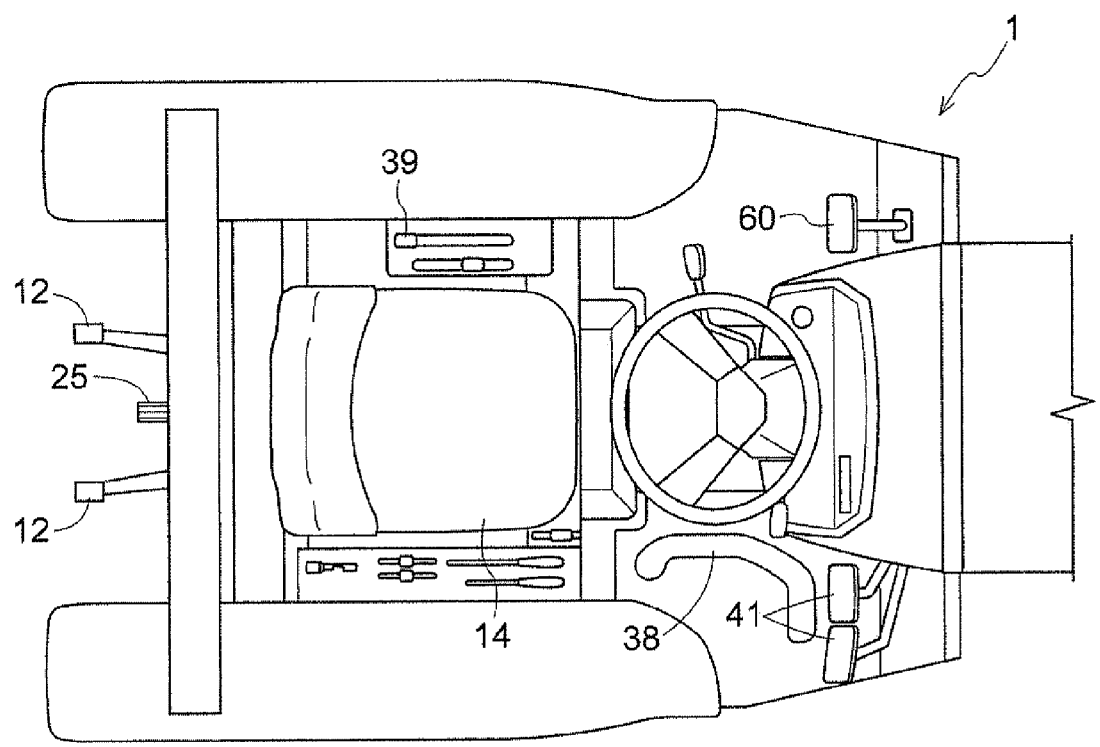
FIG. 13 is a plan view showing the arrangement of the side brake pedals and the stop operation pedal.

A speed change pedal 38 and a speed change lever 39 as speed change controls are installed in the tractor main unit 1. As shown in FIG. 13, the speed change pedal 38 is provided at the driver's feet to the right of a driver seat 14, and the speed change lever 39 is provided to the left of the driver seat 14.

The speed change pedal 38 can be depressed forward or back, and is mechanically urged back to the neutral position by a cam mechanism not shown in the drawing.

The depression position of the speed change pedal 38 is detected by a potentiometer 40 and inputted to the control device 32, and the operation of the proportional control valves 34, 35 is controlled by a servo controller 100 provided to the control device 32, on the basis of depression position information of the speed change pedal 38 detected by the potentiometer 40, feedback information from the swash plate angle sensor 31, and detection information of a stop operation detection switch 61 described hereinafter for detecting the operation of the stop operation pedal 6.

In other words, in the servo controller 100, the operation of the proportional control valves 34, 35 is controlled so that the servo cylinder 30 moves back and forth according to the depression direction and depression amount of the speed change pedal 38 as detected by the potentiometer 40, and a swash plate angle that corresponds to the depression of the speed change pedal 38 is produced, whereby forward and reverse speed changing is performed steplessly.

When the potentiometer 40 detects that depression of the speed change pedal 38 has been released, the operation of the proportional control valves 34, 35 is controlled so that the speed change pedal 38 is automatically returned to the neutral stop position, and the output of propulsive force for travel is stopped to stop travel.

Although this aspect of the structure is not shown in the drawing, the speed change lever 39 is operatively connected in a mechanical manner so that the speed change pedal 38 can be operated only in the forward speed change direction, and is supported so as to be able to be retained by friction in any operation position. The operation position of the speed change lever 39 is detected by the potentiometer 40 for detecting the operation position of the speed change pedal 38. In a state in which the speed change lever 39 is retained in the operative connection release position n, the operative connection between the speed change lever 39 and the speed change pedal 38 is released, and the speed change pedal 38 can be depressed throughout the entire range from forward to reverse.

The speed change pedal 38 is operated in the forward depression direction (forward speed increase direction) as the speed change lever 39 is moved forward from the operative connection release position n shown in FIG. 12, and the speed change lever 39 is frictionally retained in any operation position of the forward speed change range, whereby the speed change pedal 38 urged back toward the neutral position is prevented from returning to the neutral position and retained in the arbitrary forward speed change range, and forward travel occurs at a constant speed according to the arbitrary speed that corresponds to the operation position of the speed change lever 39. In other words, the speed change lever 39 constitutes a target speed setting means for setting a target speed of the hydro static transmission.

In a state in which the speed change pedal 38 is retained in the middle position of the forward speed change range by the speed change lever 39, the speed change pedal 38 is allowed to be depressed in the direction of a higher forward speed increase, and the speed change pedal 38 returns to the speed set by the speed change lever 39 when no longer depressed.

[Operative Connection Structure for Side Brake Pedals]

As shown in FIG. 14, a pair of left and right side brake pedals 41 as braking controls separately link-coupled to the left and right side brakes 22, respectively, are provided parallel to each other in the vicinity of the speed change pedal 38, and the left and right side brake pedals 41 are coupled and connected to an actuation arm 43 via a link mechanism 42.

The link mechanism 42 is configured so that the actuation arm 43 is not rotated when only one of the side brake pedals 41 is operated in the depression direction that is the travel stop direction, and so that the actuation arm 43 is rotated an angle commensurate with the depression amount only when both of the side brake pedals 41 are simultaneously depressed. The rotation angle of the actuation arm 43 is detected by a potentiometer 44 and inputted to the control device 32.

The PTO clutch 24 is composed of a multi-plate friction clutch that is engaged when oil pressure is applied, and disengaged by spring force when application of oil pressure is released, and the oil pressure applied is controlled via an electromagnetic proportional control valve 45 connected to the control device 32.

A PTO clutch lever 46 is provided to the right of the driver seat 14, the operation position of the PTO clutch lever 46 is detected by a PTO engagement/disengagement switch 47, and the detection information is inputted to the control device 32. An operative connection state switch 48 is also connected to the control device 32, and the operative connection state switch 48 switches operation between a state in which the PTO clutch 24 and the left and right side brakes 22 operate in operatively connected fashion, and a state in which the operative connection is released, and the PTO clutch 24 and the left and right side brakes 22 each operate independently.

The control device 32 is provided with a first PTO pressure controller 101 for outputting a control signal to the electromagnetic proportional control valve 45 on the basis of the detection information of the PTO engagement/disengagement switch 47, the operative connection state switch 48, and the potentiometer 44 for detecting the rotation angle of the actuation arm 43.

Consequently, when the PTO clutch lever 46 is placed in the "disengage" position, the proportional control valve 45 is controlled so that application of oil pressure is released, and when the PTO clutch 24 is disengaged and the PTO clutch lever 46 is placed in the "engage" position, a control signal is outputted from the control device 32 to the proportional control valve 45 so that a predetermined high oil pressure is applied, and the PTO clutch 24 becomes engaged.

When the operative connection state switch 48 is in the "disengage" state, the control device 32 maintains the PTO clutch 24 in the "disengaged" or "engaged" state according to the operation position of the PTO clutch lever 46, regardless of the operation of the left and right side brake pedals 41.

The PTO clutch 24 is controlled in the manner described below in operative connection with the operation of the left and right side brake pedals 41 only when the operative connection state switch 48 is placed in the "engage" state, and the operation position of the PTO clutch lever 46 is "engage."

When the left and right side brake pedals 41 are depressed at the same time, the braking force of the side brakes 22 increases as the depression amount of the side brake pedals 41 increases, and the servo cylinder 30 as the hydraulic servo means for speed change operation, and the proportional control valve 45 for engaging and disengaging the PTO clutch 24 are controlled as described below.

In a state in which the speed change lever 39 is retained in an arbitrary forward position, a forward speed is set, and the PTO clutch lever 46 is placed in the "engage" position, when depression of the left and right side brake pedals 41 is released, and the left and right side brake pedals 41 return to the return position (a) as indicated by the solid line in FIG. 4, both side brakes 22 are in a released state, the powering of the proportional control valve 34 for forward travel is controlled so that the servo cylinder 30 is actuated to a predetermined position, and the continuously variable speed change device 23 is retained in a forward speed change state that corresponds to the operation position of the speed change lever 39. In the PTO clutch 24, the first PTO pressure controller 101 outputs a control signal to the proportional control valve 45, and a high oil pressure is fed to the PTO clutch 24 to engage the clutch.

When both of the side brake pedals 41 are simultaneously depressed from this state, as the depression amount is increased, the left and right side brakes 22 exert braking force, the servo cylinder 30 is controlled so as to actuate in the deceleration direction on the basis of the rotation angle of the actuation arm 43, and the travel speed gradually decreases from the forward speed set by the speed change lever 39.

When both side brake pedals 41 are simultaneously depressed to a first pre-set depression position (b), a state occurs in which electrical power to both the proportional control valves 34, 35 is cut by the servo controller 100 regardless of the retention of the speed change lever 39 in the forward speed change range, the servo cylinder 30 is returned to the neutral position, the continuously variable speed change device 23 is placed in the neutral state, and travel driving by the continuously variable speed change device 23 is stopped.

As both side brake pedals 41 are further depressed past the first depression position (b) as shown in FIG. 13, the depression amount of both side brake pedals 41 increases, and the braking force also gradually increases, but the clutch pressure of the PTO clutch 24 remains almost unchanged from the state of being positioned at the return position (a), and the clutch is kept engaged and maintained at a constant pressure. However, when both side brake pedals 41 are depressed to a second depression position (c) set in advance as the operation position at which the maximum braking force of the side brakes 22 is obtained, the first PTO pressure controller 101 outputs a control signal so as to cause the proportional control valve 45 to open the oil path, in response to a detection signal from the potentiometer 44 that detects the depression to the second depression position (c), the clutch pressure of the PTO clutch 24 is rapidly reduced, the frictional force is eliminated, and the PTO clutch 24 is in a completely disengaged state.

When only the side brake pedal 41 on the inside of a pivot is depressed while the front wheels 2 are rolling, and pivoting in a small turning circle occurs, since the actuation arm 43 does not rotate, the deceleration control or control for disengaging the PTO clutch 24 described above is not performed.

When both side brake pedals 41 are depressed to a third depression position (d) at a limit position past the second depression position (c), the relief valve 37 of the hydraulic servo means is mechanically forced open on the basis of the rotation of the actuation arm 43, the system pressure of the hydraulic servo means decreases to zero, and regardless of the control operation state of the proportional control valves 34, 35 for travel speed change, the supply of pressure oil to the servo cylinder 30 is removed, and the continuously variable speed change device 23 is returned to the neutral position.

When both side brake pedals 41 are depressed all the way to the third depression position (d), since the supply of pressure oil to the servo cylinder 30 is thus forced off, and the continuously variable speed change device 23 is returned to the neutral position, in the unlikely event that the proportional control valves 34, 35 do not return to the return position due to a failure of the electrical system during travel, the continuously variable speed change device 23 can be returned to the neutral position and travel stopped merely by depressing both side brake pedals 41 to the depression limit thereof.

The relationship in which both side brake pedals 41, the PTO clutch 24, and the servo cylinder 30 are operatively connected is the same for both the depression direction and the release direction of the side brake pedals 41.

[Operative Connection Structure for Stop Operation Pedal]

As shown in FIG. 14, the hydro static transmission 23 provided with the first oil path A and other components as the high-pressure side during forward travel and the second oil path B as the low-pressure side during forward travel is provided with the stop operation pedal 6 for releasing the oil pressure of the first oil path A that is the circuit that drives the continuously variable speed change device 23, and blocking transmission of power to the travel device.

Specifically, a return oil path 63 is provided across the oil tank T and a first oil path A that is at high pressure during forward travel in the continuously variable speed change device 23, an unload valve 64 is provided to the return oil path 63, and a throttle valve 65 is provided between the unload valve 64 and the oil tank T in the return oil path 63. The stop operation pedal 6 is configured so that the oil pressure of the first oil path A of the continuously variable speed change device 23 is released by the unload valve 64, and transmission of power to the travel device is blocked.

A stop operation detection switch 61 is also provided for detecting whether power transmission has been blocked by depression of the stop operation pedal 6, and the detection signal of the stop operation detection switch 61 is transmitted to the control device 32.

In the control device 32, a second PTO pressure controller 102 is provided for operating the proportional control valve 45 on the basis of whether depression of the stop operation pedal 6 has been detected by the stop operation detection switch 61, and the servo controller 100 for operating the proportional control valves 34, 35 for feeding pressure oil to the servo cylinder 30 is also controlled based on whether depression of the stop operation pedal 6 has been detected by the stop operation detection switch 61.

When the stop operation detection switch 61 for detecting which of the two states (engaged or disengaged) is in effect is in the engaged state, the second PTO pressure controller 102 determines that the stop operation pedal 6 is depressed, and when the stop operation detection switch 61 is in the disengaged state, the second PTO pressure controller 102 determines that the stop operation pedal 6 is not depressed.

In this second PTO pressure controller 102, when the stop operation detection switch 61 switches from the disengaged state to the engaged state, a control command to switch the PTO clutch 24 is outputted to the proportional control valve 45.

Conversely, when the stop operation detection switch 61 switches from the engaged state to the disengaged state, a control command to engage the PTO clutch 24 is outputted to the proportional control valve 45.

It is also the case in the servo controller 100 that a determination is made that the stop operation pedal 6 is depressed when the stop operation detection switch 61 is in the engaged state, and a determination is made that the stop operation pedal 6 is not depressed when the stop operation detection switch 61 is in the disengaged state.

When the stop operation detection switch 61 is in the engaged state, the supply of electrical power to the proportional control valves 34, 35 for feeding pressure oil to the servo cylinder 30 is cut, the proportional control valves 34, 35 are switched to the pressure oil discharge side as shown in FIG. 14, the pressure chamber of the servo cylinder 30 is communicated with the oil tank, and the servo cylinder 30 is returned to the neutral position by the action of the return springs 33,33, whereby the hydraulic pump 23P is returned to the neutral position.

Conversely, when the stop operation detection switch 61 is placed in the disengaged state, power is supplied to the proportional control valves 34, 35 for feeding pressure oil to the servo cylinder 30, the proportional control valve 34 for forward travel is switched from the state shown in FIG. 14 to the pressure oil feeding side, pressure oil is fed to the forward-travel pressure chamber of the servo cylinder 30, and the hydraulic pump 23P is placed in forward operation.

The amount that the swash plate of the hydraulic pump 23P is operated toward the forward side is set based on the detection signal of the potentiometer 40 for detecting the operation position of the speed change pedal 38 and speed change lever 39.

In other words, the servo controller 100 sets the swash plate angle of the hydro static transmission 23, which corresponds to the operation position of the speed change lever 39 as detected based on the detection signal of the potentiometer 40, to the swash plate angle that corresponds to the target speed of the hydro static transmission 23, and varies the swash plate angle of the hydraulic pump 23P so that this target speed is reached.

At this time, the rate at which the servo cylinder 30 varies the swash plate angle of the hydraulic pump 23P is relatively gradual, according to a speed increase rate stored and set in advance by the servo controller 100, and is set so as to prevent sudden movement of the machine body. The potentiometer 40 for detecting the operation position of the speed change lever 39 thus works as a target speed setting means for setting the target speed of the hydro static transmission 23, and the servo controller 100, the proportional control valves 34, 35, and the servo cylinder 30 constitute swash plate angle controller.

In the servo controller 100 and the second PTO pressure controller 102 to which the detection signal of the stop operation detection switch 61 is inputted, the PTO clutch 24 is disengaged after the continuously variable speed change device 23 has returned to the neutral position when operation of the stop operation pedal 6 in the depression direction is detected, i.e., when engaging of the stop operation detection switch 61 is detected. Conversely, the operational timing of the continuously variable speed change device 23 and the PTO clutch 24 is set so that the PTO clutch 24 engages before travel by the continuously variable speed change device 23 is initiated when operation of the stop operation pedal 6 in the non-depression direction, i.e., when disengagement of the stop operation detection switch 61 is detected.

This operational timing is set according to the estimated time lag that occurs before the servo cylinder 30 returns to the neutral position after the proportional control valves 34, 35 have switched to the pressure oil discharge side, and according to the estimated time lag that occurs before the clutch pressure of the PTO clutch 24 reaches a predetermined pressure after the proportional control valve 45 for feeding pressure oil to the PTO clutch 24 has switched to the pressure oil feeding side.

The second PTO pressure controller 102 and first PTO pressure controller 101 are configured so that either is selected to control the proportional control valve 45, and so that the proportional control valve 45 is controlled by the first PTO pressure controller 101 when both side brake pedals 41 are operated, and the rotation angle of the actuation arm 43 is detected by the potentiometer 44.

Consequently, in a state in which the proportional control valve 45 is thus controlled by the first PTO pressure controller 101, the first PTO pressure controller 101 has priority for controlling the PTO clutch pressure even when the stop operation detection switch 61 detects that the stop operation pedal 6 is depressed. Even when the stop operation detection switch 61 has detected earlier that the stop operation pedal 6 is depressed, and the PTO clutch pressure is being controlled by the second PTO pressure controller 102, when both side brake pedals 41 are operated, and the detection signal of the potentiometer 44 is transmitted to the first PTO pressure controller 101, control by the second PTO pressure controller 102 is stopped, and the first PTO pressure controller 101 has priority for control.

Other Modes of the Second Embodiment (1) In the embodiment described above, the unload valve 64 and the return oil path 63 to the oil tank T are provided in a state of being communicated only with the first oil path A that is the drive circuit on the forward travel side of the hydro static transmission 23, and the return oil path 63 and unload valve 64 are operated by the stop operation pedal 6. However, this configuration is not limiting, and a configuration may be adopted in which the unload valve 64 and the return oil path 63 to the oil tank T are provided so as to also be communicated with the second oil path B of the reverse travel side, both unload valves 64, 64 are operated at the same time by the stop operation pedal 6, and stopping can take place in the forward side or the reverse side.

In this case, control may be performed so that the direction, forward or reverse, in which the travel device had been traveling prior to depression of the stop operation pedal 6 is stored in the memory of the servo controller 100 according to the detection signal from the potentiometer 40 for detecting the operation position of the speed change lever 39, the direction in which the device is to start moving when the stop operation pedal 6 is no longer depressed is retrieved from the memory, and the device moves in the same direction as the direction of travel prior to stopping.

(2) In the embodiment described above, the operational timing of the hydro static transmission 23 and the PTO clutch 24 with respect to operation of the stop operation pedal 6 is set by providing the aforementioned time lag. However, this configuration is not limiting, and a configuration may be adopted in which a vehicle speed sensor is provided to the travel transmission system, for example, or a sensor for detecting rotation of the PTO shaft is provided to the PTO transmission system, and the start of actual travel, or the start of actual rotation of the PTO shaft is detected to set the operational timing.

(3) The stop operation mechanism operated by the stop operation pedal 6 is not limited to the hydro static transmission 23, and may be a gear-type speed change device or a travel clutch.

What is claimed is:

1. A travel operation structure of a work vehicle, comprising:
    a pair of left and right side brake pedals disposed on either the left or right of a steering wheel;
    a hydro static transmission for changing the speed of travel; and
    a stop operation pedal disposed on the other of the left and right of said steering wheel;
    wherein the corresponding left or right side brake is applied when one of said pair of left and right side brake pedals is depressed, and when both the left and right side brake pedals are depressed, both the left and right side brakes operate, and travel is stopped; and
    when said stop operation pedal is depressed, operating oil of said hydro static transmission is directed into an oil tank, and said hydro static transmission is switched to a neutral stop position for blocking transmission of power to said travel device.

2. The travel operation structure of a work vehicle according to claim 1, further comprising:
    a first operative connection member provided across said hydro static transmission and said stop operation pedal;
    wherein said first operative connection member switches said hydro static transmission to said neutral stop position when said stop operation pedal is depressed.

3. The travel operation structure of a work vehicle according to claim 2, further comprising:
    a second operative connection member provided across both said side brakes and said hydro static transmission;
    wherein the second operative connection member applies both the left and right side brakes and switches said hydro static transmission to said neutral stop position when both the left and right side brake pedals are depressed.

4. The travel operation structure of a work vehicle according to claim 1, further comprising:
    a second operative connection member provided across both of said side brakes and said hydro static transmission;
    wherein the second operative connection member applies both the left and right side brakes and switches said hydro static transmission to said neutral stop position when both the left and right side brake pedals are depressed.

5. A transmission device of a work vehicle, comprising:
    a travel drive system for transmitting engine power to a travel device;
    an implement drive system for transmitting engine power to an external power takeoff shaft;
    a hydro static transmission for changing the speed of power to the travel device and transmitting the power to said travel drive system;
    a hydraulically operated PTO clutch for interrupting power transmission to the external power takeoff shaft by said implement drive system;
    a stop operation pedal able to switch between alternatives of a power blocking state of directing, to an oil tank, operating oil that is in a drive circuit to a hydraulic motor from a hydraulic pump of said hydro static transmission, and a state of canceling the power blocking state and driving the hydraulic motor; and a swash plate angle controller for returning a swash plate of said hydro static transmission to a neutral position in response to a stop operation by said stop operation pedal;

wherein said hydro static transmission and PTO clutch are operatively connected with respect to said stop operation pedal so that the hydro static transmission will be manipulated to the neutral position, and the PTO clutch will disengage as said stop operation pedal is depressed, and the PTO clutch will engage as the depressed stop operation pedal is released; and an operational timing is set so that the PTO clutch will disengage after said hydro static transmission returns to the neutral position when said stop operation pedal is depressed, and the PTO clutch will engage before travel by said hydro static transmission is initiated when the depressed stop operation pedal is released; and target speed setting means for setting a target speed of said hydro static transmission;

wherein, when said stop operation pedal switches to the state of canceling the power blocking state and driving the hydraulic motor, the swash plate angle controller is configured so as to gradually change, at a pre-set speed increase rate, the speed at which the swash plate angle is changed until a swash plate angle that corresponds to said target speed is reached from the neutral position of the hydro static transmission.

6. The transmission device of a work vehicle according to claim 5, wherein said target speed setting means comprises a speed change lever operable to change the swash plate angle of said hydro static transmission.

7. The transmission device of a work vehicle according to claim 6, wherein the stop operation pedal comprises a pedal provided separately from a pair of left and right side brake pedals.

8. The transmission device of a work vehicle according to claim 5, wherein the stop operation pedal comprises a pedal provided separately from a pair of left and right side brake pedals.

* * * * *